April 14, 1959        A. M. COHEN        2,882,422
COMBINED VOLTAGE AND CURRENT REGULATING SYSTEM
Filed Aug. 22, 1955        2 Sheets-Sheet 2

INVENTOR.
ARTHUR M. COHEN
BY
James and Franklin
ATTORNEYS.

United States Patent Office 2,882,422
Patented Apr. 14, 1959

2,882,422

COMBINED VOLTAGE AND CURRENT REGULATING SYSTEM

Arthur M. Cohen, Westport, Conn.

Application August 22, 1955, Serial No. 529,824

6 Claims. (Cl. 307—57)

The present invention relates to a system for regulating the rectified output of an alternator so that the output will maintain constant voltage as load increases up to a predetermined load current, beyond which point increasing load causes substantially no increase in the load current. The system is particularly adapted for use when an alternator is employed for the charging of a battery and the invention is here thus specifically disclosed, but the invention is of much more general applicability.

There are many instances in which, for safety reasons or otherwise, the output current of an energy source must be limited. In many such applications it is also desired that the voltage of that source be maintained substantially constant over a wide range of load conditions. Particularly when a power driven rotating machine is employed as the source, simultaneous attainment of regulation of voltage and current output presents an appreciable problem. While various schemes have been devised in the past to accomplish these ends, they usually call for the employment of separate regulating instrumentalities for control of current and voltage respectively.

The finger type regulator shown in Cohen Patent 2,580,732 and sold by the assignee of this application under the trademark "Regohm" is typical of one kind of instrumentality which can be used for this purpose. It comprises an electromagnet coil which acts to position an armature and thus sequentially open and close a plurality of contact pairs, the contact pairs being appropriately electrically connected to a reactance, usually in the form of a resistance, so that the number of contact pairs open or closed at any given moment will determine the effective value of that reactance in an appropriate control circuit. When used for voltage or current regulation of the output of an alternator or generator, the electromagnet coil is connected to the output line to sense the desired parameter and the controlled reactance is connected to the energizing field of the generator or alternator. Variations in the output voltage or current will change the energization of the electromagnet coil, the position of the armature will be altered, and the energization of the field will be correspondingly altered so as to bring the output voltage or current back to its desired value.

The primary object of the present invention is to permit the attainment of accurate voltage regulation so long as the load current is below a given value and also to prevent any increase in load current above that given value, to accomplish these results where the source of energy is an alternator the output of which is rectified to produce D.C., and to accomplish these results through the use of a single regulating instrumentality and with a minimum of additional circuitry.

In accordance with the present invention a single regulating instrumentality is employed which includes an electromagnet coil connected across the rectified output of the alternator and effective to regulate the output voltage in conventional manner. Means are connected to the alternator output in advance of rectification so as to sense the amount of current flowing in the A.C. portion of the output circuit. A D.C. signal is derived from the sensing means, that signal being proportional to the A.C. current. The D.C. signal is applied to the electromagnet coil via a rectifier oriented to permit current flow to the coil but not in the opposite direction. The D.C. signal will be effective to energize the electromagnet coil only when its magnitude is greater than the electrical potential applied to the coil normally attendant upon the voltage regulating action of the coil. Hence the regulating instrumentality will function solely as a voltage regulator unless and until the output current reaches a predetermined value such that the D.C. potential derived thereby is sufficient to permit energization of the coil by that D.C. potential, after which the regulator will function to reduce the energization of the alternator so that the output current will remain substantially constant, the voltage then dropping abruptly. A feature of the instant system is that the sensing of the output current to be regulated is attained without materially affecting that current and without causing any appreciable losses in the output circuit. To that end a current transformer is connected to the A.C. output of the alternator. Current transformers have the characteristic of producing in their secondary windings a current proportional to the current being measured and flowing through their primary windings substantially independently of the impedance in the secondary winding circuit.

Two different circuit arrangements are here disclosed for achieving these results. In one, two separate rectifiers are employed, one for converting the A.C. output from the current transformer so as to permit the derivation of a D.C. potential therefrom and the other serving to prevent current flow from the electromagnet coil to the current transformer secondary circuit. In this embodiment the first rectifier must be of fairly appreciable current carrying capacity. This system is particularly applicable for use where a pair of alternators are to operate in parallel, since the same resistors employed to derive the D.C. potentials from the rectified outputs of the secondaries of the current transformers connected respectively to the two alternators are also employed to control the joint operation of those alternators in parallel.

Where parallel operation of alternators is not a factor, a second system is preferred in which the unrectified output of the secondary winding of the current transformer passes through a resistor, a single rectifier unit being connected across the resistor, that unit functioning both to derive a D.C. potential from the A.C. voltage drop across the resistor and also serving to prevent current flow from the electromagnet coil to the current transformer circuit. In this system the rectifiers may be of much smaller current carrying capacity than in the first described system, since the A.C. output of the secondary winding of the current transformer does not pass therethrough, the rectifier unit only having to handle that current which actually energizes the electromagnet coil when the output current of the alternator exceeds its predetermined value. Thus the second system is seen to be somewhat more economical than the first, but less adaptable to special situations such as paralleling.

The system provides, of course, for independent control of the regulated values of voltage and current.

To the accomplishment of the above, and to such other objects as may hereinafter appear, the present invention relates to a system for combined voltage and current regulation of the rectified output of an alternator, and to the use of that system in facilitating the control of alternators connected in parallel, as defined in the appended claims and as described in this specification, taken together with the accompanying drawings, in which:

Figure 1:
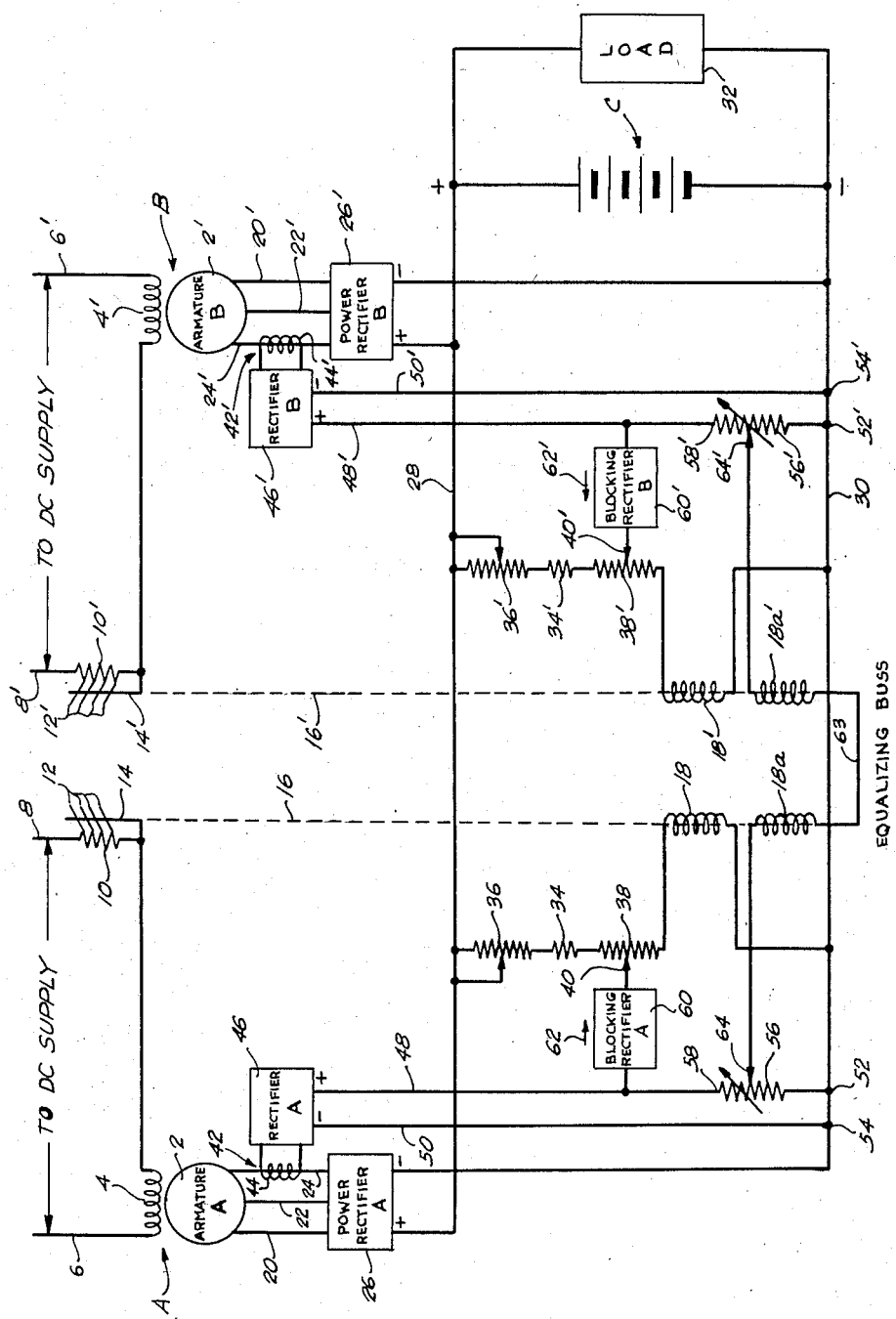
Fig. 1 is a circuit diagram of one embodiment of the present invention particularly designed for use with paralleled alternators.

Fig. 1 discloses the system of the present invention as used when a pair of alternators generally designated A and B are connected in parallel to charge a battery generally designated C. The regulating systems for each alternator are substantially identical, and for the most part a description of one will suffice for the other, the same reference numerals therefore being applied to corresponding parts of the individual alternators and associated control circuitry except that primes are applied to the parts associated with alternator B.

Each alternator comprises an armature 2 and a field 4, the field being connected to a D.C. supply through lines 6 and 8. A variable resistance 10 is connected in line 8 in series with the field 4, the value of that resistance 10 being altered in order to provide for regulation. In the form here specifically disclosed a plurality of fingers 12 are connected to appropriate points along the length of the resistor 10, those fingers normally engaging the shorting bar 14, the fingers 12 being sequentially lifted from the shorting bar 14 so as to increase the effective value of the resistance 10 by means of an operative connection, schematically indicated by the broken line 16, between those fingers and an electromagnet coil 18. The operative connection 16, when an instrumentality of the type disclosed in the aforementioned Cohen Patent 2,580,732 is employed, is constituted by the armature of that instrumentality. Increase in the eeffctive resistance of the element 10 will reduce the energization of the field 4 and therefore will reduce the output from the armature 2.

As here specifically disclosed the alternators A and B have a three-phase output and therefore have three output lines 20, 22 and 24. These output lines feed into a power rectifier 26 which has high and low potential output terminals connected respectively to the high and low potential output lines 28 and 30. The battery C is connected across the lines 28 and 30, and a load 32 fed by the battery C may also be connected thereacross.

The coil 18 of the regulating instrumentality is connected across the D.C. output lines 28 and 30 in series with a limiting resistor 34, a variable resistor 36 and a third resistor 38 provided with a movable tap 40. Adjustment of the value of the variable resistor 36 will control the value of D.C. voltage at which the system will regulate, as is conventional.

In order to provide for current regulation of the type desired, that is to say, in order to regulate the output of each alternator so that its output current will not exceed a predetermined value, a current transformer generally designated 42 is connected in one output leg of the alternator, here shown as the line 24. The secondary winding 44 of the current transformer 42 will have an A.C. current induced therein which is, within limits, closely proportional to the current flowing in the line 24. The current in the secondary winding 44 is changed to D.C. by means of rectifier 46, the high and low potential D.C. output terminals of the rectifier 46 being connected respectively to lines 48 and 50, those lines in turn being connected at points 52 and 54 respectively to the low potential output line 30. A resistor 56, which may be variable, is connected in the line 48 and its high potential end 58 is connected to the movable tap 40 on the resistor 38 via blocking rectifier 60, that rectifier being oriented to permit current flow only toward the electromagnet coil 18, as indicated by the arrow 62.

The system as thus far described will function to control the output current of the alternator in the following manner: The current induced in the secondary winding 44 of the current transformer 42, after being rectified, will flow through the resistor 56, and that current will be proportional to the current in the output line 24 of the alternator. This will produce a voltage drop in the resistor 56 proportional to the magnitude of that current and to the magnitude of the resistance of the resistor 56. The lower end of the resistor 56 is at the same potential as the lower end of the electromagnet coil 18. Because of the current flowing through the electromagnet coil 18 as the latter functions to regulate voltage in conventional manner, the tap 40 on the resistor 38 will be at a predetermined potential above that of the line 30. That potential can, of course, be controlled within limits by positioning the tap 40 along the resistor 38, since the current which flows through the coil 18 also flows through the resistor 38. So long as the potential difference between the tap 40 and the line 30 exceeds the potential difference between the end 58 of the resistor 56 and the line 30, no current regulation will result and conventional voltage regulation will take place, since the blocking rectifier 60 prevents current flow from the tap 40 toward the line 48. The value of the resistor 56 and the position of the tap 40 on the resistor 38 will be so chosen that this situation will exist so long as the output current of the alternator does not exceed a predetermined value.

When, however, the output current does exceed that predetermined value, the voltage drop across the resistor 56 will increase, the potential difference between point 58 and line 30 will exceed the potential difference between point 40 and line 30, and current will flow through the blocking rectifier 60 in the direction of the arrow 62, that current then flowing downwardly through a portion of the resistor 38 and through the coil 18. Thus the coil 18 will be increasingly energized just as though the output voltage had increased, it will act to increase the value of the resistor 10 in series with the field 4, and the energization of the field 4 will be correspondingly decreased until a position of equilibrium is established at which the output current has resumed its desired value. This will, of course, be accompanied by a corresponding decrease in the output voltage. An equilibrium condition of the regulating instrumentality will result, and this equilibrium condition will continue unless there is some change in the output of the alternator. If that change should be in the direction of increasing output current, the coil 18 will again be additionally energized, the resistance 10 will be increased, and current will be brought back to its desired value. If the output current should fall the energization of the coil 18 will lessen, the value of the resistor 10 will decrease, and the output of the alternator will correspondingly increase. As soon as the output current has fallen below the nominal value, the blocking rectifier 60 will prevent the current in the secondary circuit of the current transformer from having any effect on the current in the coil 18, and that coil 18 will resume its normal function of regulating voltage in a conventional manner.

As thus far described the point at which the current regulating system will take over can be adjusted either by varying the resistance of the resistor 56 or by adjusting the position of the tap 40 on the resistor 38, or both. Normally only one or the other of these adjustments need be provided.

When, as shown in Fig. 1, two alternators A and B are to be connected with their outputs in parallel, the electromagnets are provided with additional energizing coils 18a and 18a' respectively, those coils being wound so as to aid the coils 18 and 18' respectively. The low potential ends of the coils 18a and 18a' are connected by equalizing buss 63. The high potential ends of those coils are connected respectively to taps 64 and 64' on the resistors 56 and 56' respectively. The taps 64 and 64' are positioned so that, when both alternators A and B are supplying equal currents, the potentials of the taps 64 and 64' will be identical. Under these circumstances no current will flow through the coils 18a and 18a'. If one alternator, for example the alternator A, should tend to supply more current (say because of an increase in the speed of its prime mover), more current would flow through the resistor 56 than through the resistor 56'. Hence the potential of the tap 64 would be higher than the potential of the tap 64' and a current will flow from the former to the latter. That current, in flowing through coil 18a from top to bottom, would augment the action of the coil 18 and would therefore reduce the energization of the field 4, thus reducing the output of the alternator A. The current, in flowing through coil 18a' from bottom to top, would produce an electromagnetic effect in opposition to that produced by the coil 18', the energization of the resistor 10' would be decreased, and hence the output of the alternator B would be increased. If the alternators A and B are not identical, the settings of the taps 64 and 64' may be adjusted to compensate for that inequality and thus still maintain equal loading of the alternators A and B under all circumstances. It will be noted that when this paralleling arrangement is employed in conjunction with the current regulating system here described, the same resistors 56 and 56' from which, at least in part, the D.C. potential for current regulating purposes is derived are also employed to control the parallel operation of the alternators. Thus simplicity of circuitry and minimization of the number of circuit elements required is attained.

In the current regulating system of Fig. 1 the rectifier 46 is always functioning and always carries the appreciable current flowing in the secondary winding 44 of the current transformer 42. Thus the rectifying elements employed in the rectifier 46 must be fairly expensive. In the system disclosed in Fig. 2 this drawback is eliminated. There the resistor 56a is connected directly across the secondary winding 44 of the current transformer 42, so that alternating current flows through the resistor 56a. The low potential load line 30 is connected by means of lead 66 to a tap 68 substantially at the midpoint of the secondary winding 44. A rectifier, generally designated 70 and defined by a pair of opposed rectifier elements 72 and 74, is connected across the resistor 56a, and a point 76 between the two rectifiers 72 and 74 is connected by line 78 to the tap 40 on the resistor 38 in series with the electromagnet coil 18. The orientation of the rectifier elements 72 and 74 is such that current can only flow in the direction of the arrow 62 from the point 76 through the line 78 toward the tap 40.

Figure 2:
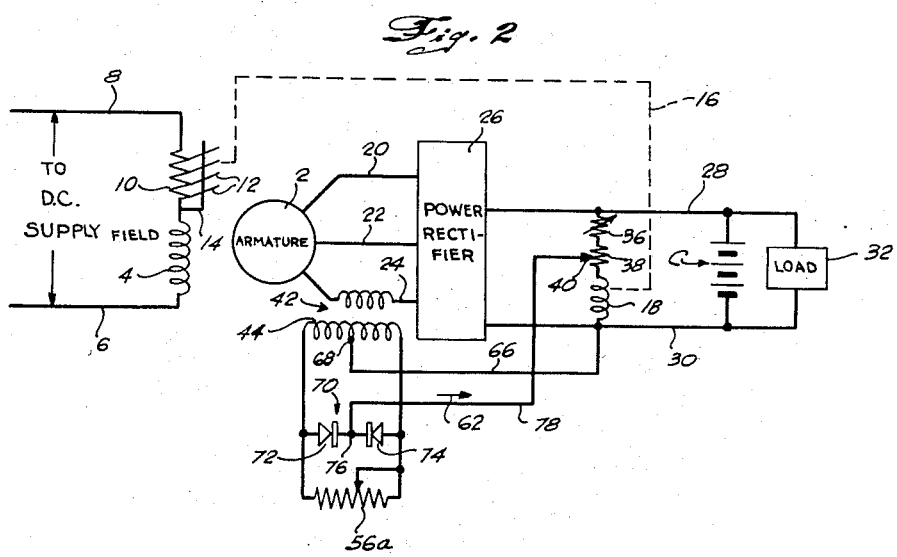
Fig. 2 is a circuit diagram of a second and more economical embodiment of the present invention.

In the system of Fig. 2 an A.C. voltage drop will be produced in the variable resistor 56a, and that drop will be proportional to the value of the resistance thereof and to the magnitude of the current in the A.C. output line 24 of the alternator, it being remembered that the characteristic of the current transformer 42 is that the current in the secondary winding 44 thereof will be proportional to the current in the primary winding thereof substantially independently of the magnitude of the resistor 56a in series therewith. Hence a D.C. potential will be produced between points 68 and 76, and that D.C. potential is applied across the electromagnet coil 18 in the same manner as in the embodiment of Fig. 1, that is to say, the high potential point 76 is connected to the high potential end of the coil 18 and the low potential point 68 is connected to the low potential end of the coil 18. The system of Fig. 2 will thus function to regulate the current output of the current alternator once that current has reached a predetermined value in the same manner as has previously been described with respect to the system of Fig. 1, except that the rectifier 46 of Fig. 1, which always carried current, has been eliminated, the rectifying elements 72 and 74 of the system of Fig. 2 now functioning both to produce a D.C. potential and to block current flow in a direction opposite to that of the arrow 62. The rectifying elements 72 and 74 will only carry current after the alternator output current has exceeded its predetermined value, and even then will not have to carry the entire current output of the secondary winding 44 of the current transformer 42, but only that current which is actually employed to energize the coil 18 for current regulation purposes.

In Fig. 2, as in Fig. 1, the system may be adjusted to function at a particular value of alternator output current either by varying the resistor 56a or the position of the tap 40 on the resistor 38, and ordinarily either one or the other, but not both, of these methods of adjustment need be provided. In the system of Fig. 1, when control of alternators in parallel is involved, it is preferred that the resistors 56 and 56' be non-variable, adjustment of the current regulation preferably being accomplished through positioning of the taps 40 and 40' along the resistors 38 and 38' respectively. In the embodiment of Fig. 2, it is usually satisfactory to eliminate the resistor 38 and tap 40 and connect the line 78 to the high potential end of the coil 18, relying on variation of the resistor 56a to control the position at which current regulation commences.

Figure 3:
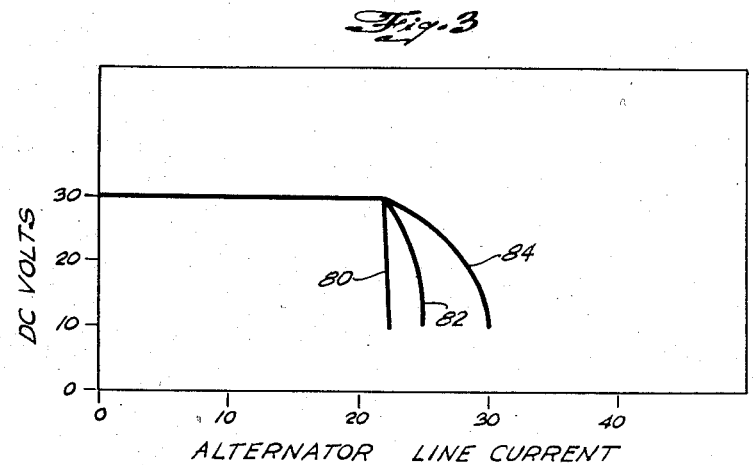
Fig. 3 is a graph illustrating the performance of the system of Fig. 2.

Fig. 3 discloses typical performance curves of the system of Fig. 2. The horizontal coordinates represent the volts across the D.C. output lines 28 and 30. The vertical coordinates represent the current output of the alternator. It will be noted that as the load increases the line current increases while the voltage remains constant at 30 volts, that being the voltage determined by the setting of the resistor 36. However, when the line current reaches approximately 21 amperes, that representing the value corresponding to a particular setting of resistor 56a, increase in load is accompanied by a sharp drop in the output voltage and with little or no increase in the output current. When the battery C is substantially fully charged at the time that the output current reaches the predetermined value of 21 amperes, the output current will drop off sharply as load is increased, as indicated by the curve 80. If the battery C is weak the characteristics of the system will correspond to curve 82, while if there is no battery at all, but only a load, the characteristics will correspond to curve 84. Thus it will be seen that the battery C, in some manner not at present fully understood, serves to sharpen the regulatory cutoff of the system here under discussion, but even if the battery is not present the system will serve to limit the line current (the curve 84 approaches a value of 30 amperes asymptotically) and will cause the line current to drop off rather steeply once it has attained its predetermined value of 21 amperes.

The systems of the present invention involve the use of but a limited number of circuit elements, and in particular permit the attainment of current control as well as voltage control through the use of a single regulating instrumentality and without having to interpose in the output circuit any elements which would adversely affect that circuit or give rise to appreciable losses therein.

While the invention has been here disclosed in conjunction with alternators having three-phase outputs, and in systems in which a battery is charged, it will be apparent that the invention may be applied to alternators having any number of phases and to systems other than those employed for battery charging, and that numerous variations may be made in the circuit details of the system, all within the spirit of the invention as defined in the following claims.

I claim:

1. A combined voltage and current regulating system for use with an alternator having a field and an A.C. output rectified to produce a D.C. output, said alternator having a nominal voltage and current output, said regulation being accomplished by varying the energization of said field in accordance with the D.C. energization of an electromagnet coil; said system comprising said coil being connected across said D.C. output, a current transformer connected to the A.C. output of said alternator and having a secondary winding connected to a resistor, means for deriving a D.C. potential from said resistor, said potential deriving means and said coil being electrically connected to oppose one another voltage-wise, said system including means for preventing current flow through said electrical connection except in a sense such as to operatively energize the coil from said current transformer, said D.C. potential derived from said resistor being greater than the D.C. potential derived from the D.C. output of said alternator whenever said current output becomes greater than said nominal value and said voltage output is at said nominal value.

2. The system of claim 1, in which said resistor is connected across said secondary winding so that an alternating current passes therethrough, opposed rectifiers connected across said resistor and constituting said current flow preventing means and part of said potential deriving means, a point between said rectifiers being connected to that end of said coil having a corresponding potential, the other end of said coil being connected to a point on said secondary winding.

3. A combined voltage and current regulating system for use with an alternator having a field and an A.C. output rectified to produce a D.C. output, said alternator having a nominal voltage and current output, said regulation being accomplished by varying the energization of said field in accordance with the D.C. energization of an electromagnet coil; said system comprising said coil being connected across said D.C. output, a current transformer connected to the A.C. output of said alternator and having a secondary winding, a rectifier connected to said secondary winding and having a D.C. output, a resistor connected to said rectifier so that the D.C. output of said rectifier passes therethrough, the low potential end of said resistor being connected to the low potential end of said coil, the high potential end of said resistor being connected to the high potential end of said coil, one of said last mentioned connections including a blocking rectifier permitting current flow only from said current transformer to said coil, the D.C. potential derived from said resistor being greater than the D.C. potential derived from the D.C. output of said alternator whenever said current output becomes greater than said nominal value and said voltage output is at said nominal value.

4. A combined voltage and current regulating system for use with an alternator having a field and an A.C. output rectified to produce a D.C. output, said alternator having a nominal voltage and current output, said regulation being accomplished by varying the energization of said field in accordance with the D.C. energization of an electromagnet coil; said system comprising said coil being connected across said D.C. output, a current transformer connected to the A.C. output of said alternator and having a secondary winding, a resistor connected across said secondary winding so that A.C. passes therethrough, a pair of opposed rectifiers connected in parallel with said resistor, a tap on said secondary winding, said tap being connected to one end of said coil, and a point between said rectifiers being connected to the other end of said coil, said last mentioned connections being in a sense such that the high and low potential ends of said coil are connected respectively to the higher and lower potential points respectively of said tap and said point between said rectifiers, the D.C. potential derived from said resistor being greater than the D.C. potential derived from the D.C. output of said alternator whenever said current output becomes greater than said nominal value and said voltage output is at said nominal value.

5. The system of claim 4, in which said resistor is adjustable, thereby varying the potential produced thereby for a given amount of current in the primary winding of said current transformer.

6. A combined voltage and current regulating and paralleling system for use with a pair of alternators each having a field and an A.C. output rectified to produce a D.C. output, the regulation of each alternator and the control of the paralleling of said alternators being accomplished by varying the energization of the field of each alternator in accordance wtih the D.C. energization of an electromagnet having first and second coils; the system for each alternator comprising said first coil being connected across said D.C. output, a current transformer connected to the A.C. output of said alternator and having a secondary winding, a rectifier connected to said secondary winding and having a D.C. output, a resistor connected to said rectifier so that the D.C. output of said rectifier passes therethrough, the low potential end of said resistor being connected to the low potential end of said first coil, the high potential end of said resistor being connected to the high potential end of said first coil, one of said last mentioned connections including a blocking rectifier permitting current flow only from said current transformer to said first coil, and an adjustable tap on said resistor, corresponding ends of the second coils of each electromagnet being connected together, the other ends of each of said second coils being connected to the taps on the resistors associated with their respective alternators, said second coils being wound relative to their respective first coils in a sense such that the passage of current through a given second coil from the tap on the resistor associated with its alternator will cause said second coil to aid the first coil associated therewith.

References Cited in the file of this patent

UNITED STATES PATENTS

| | | |
|---|---|---|
| 2,298,536 | Logan | Oct. 13, 1942 |
| 2,357,087 | Alexanderson | Aug. 29, 1944 |
| 2,707,263 | Jorgenson | Apr. 26, 1955 |
| 2,719,259 | Miner | Sept. 27, 1955 |